Nov. 7, 1933.  E. O. HULBURT ET AL  1,934,310
VISIBILITY METER AND METHOD OF MEASURING VISIBILITY
Filed Dec. 6, 1932   2 Sheets-Sheet 1

INVENTOR
Edward O. Hulburt
BY Charles Bittinger
ATTORNEY

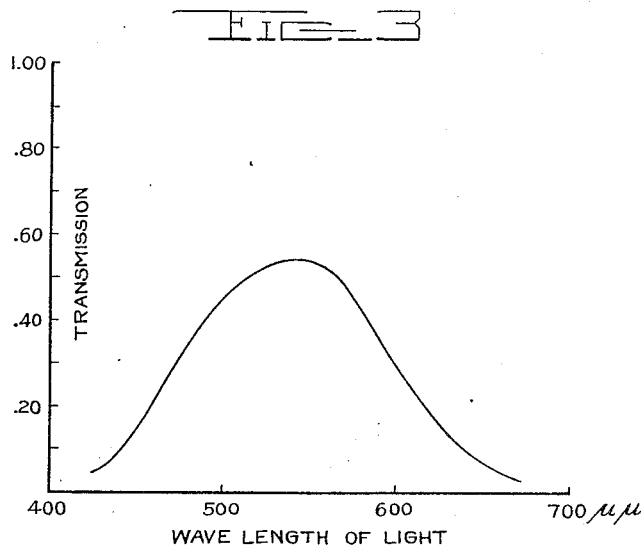
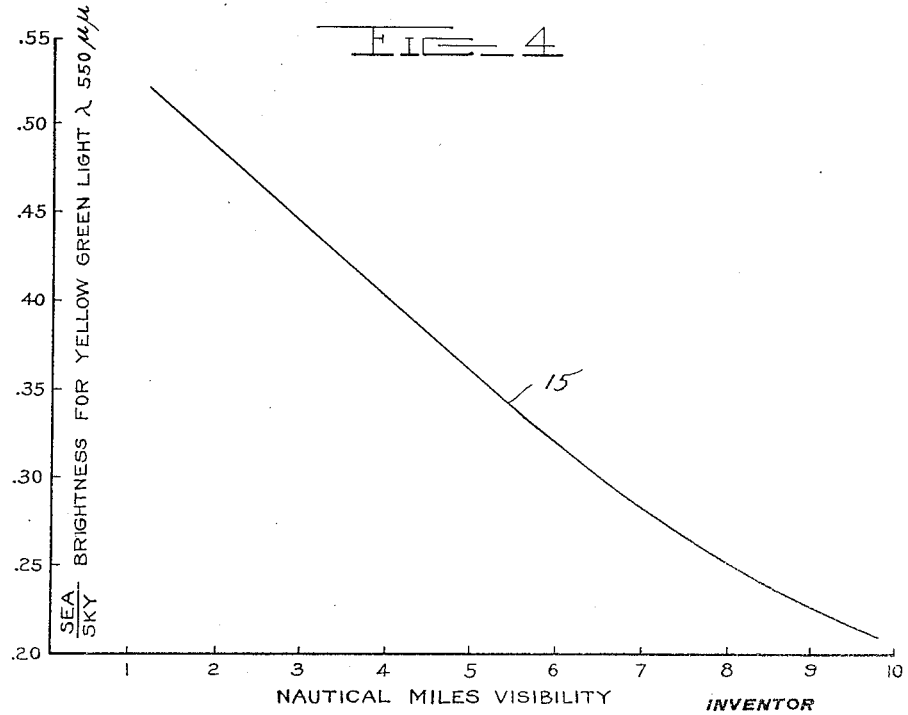

Patented Nov. 7, 1933

1,934,310

UNITED STATES PATENT OFFICE 1,934,310

VISIBILITY METER AND METHOD OF MEASURING VISIBILITY

Edward O. Hulburt and Charles Bittinger, Washington, D. C.

Application December 6, 1932. Serial No. 646,003

8 Claims. (Cl. 88—23)

This invention relates to a device and method for determining visibility at sea and has for its object to provide means for comparing the brightness of the sea with that of the sky at the horizon and so to obtain a measure of visibility.

With the above and other objects in view, the invention consists in the construction, combination and arrangements of parts as will be described more fully hereinafter.

In the drawings:

Fig. 3 is a spectrophotometric curve for the preferred wedge at one point;

Fig. 4 is a curve showing the relation between the visibility distance and the relative brightness of the sea and of the sky at the horizon.

Figure 1:
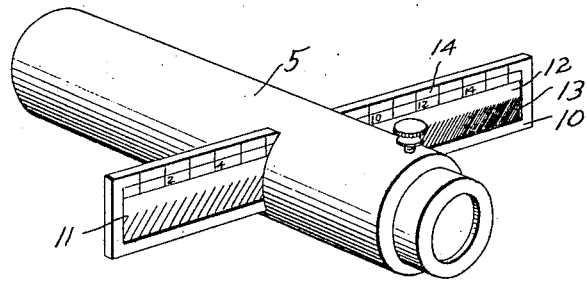
Fig. 1 is a perspective view of our invention.
Figure 2:
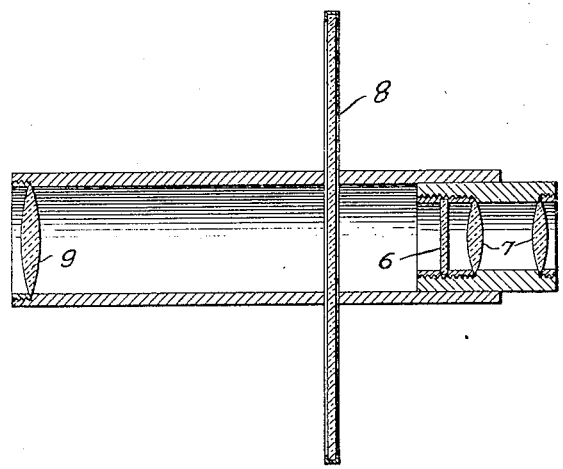
Fig. 2 is a longitudinal section thereof.

The operation of the present invention depends upon the measurement of the relative brightness of the sky at the horizon to that of the sea at the same line. In clear weather, that is, when the visibility is good, the sky at the horizon is much brighter than the sea; on the other hand, when the visibility is poor the sky and the sea have almost the same brightness. Thus the relative brightness of the sea and of the sky near the horizon varies with the visibility and a comparison of their relative brightness, properly calibrated, affords a measurement of the visibility.

It has been found that a yellow-green wedge with a yellow-green filter makes the best color combination and gives satisfactory measurements for all kinds of weather, ranging from blue sky and blue sea to gray sky and sea. Other colors are satisfactory for a particular set of conditions but for all kinds of weather the yellow-green wedges are most satisfactory. For example, blue wedges with blue color filter give a good match on blue days but not when the weather is gray, while gray wedges and gray filter are satisfactory for gray days but not for blue ones. The operation of the yellow-green wedges and filters under varying weather conditions is probably due to a number of factors, such as the energy distribution in the spectrum of daylight, the visibility curve of the eye, etc.

The form of our invention at present preferred comprises a low power telescope 5 having a light filter 6 therein adjacent the ocular lenses 7 and with a wedge 8 slidably mounted in the tube of the telescope substantially in the focal glass between the ocular system and the objective lens 9.

The wedge 8 comprises a frame 10 in which is mounted a transparent plate 11 having a clear portion 12 through which the sea at the horizon is observed and a colored portion 13 through which the sky at the horizon is seen. The portion 13 varies from one end to the other in its properties of transmitting light, being only slightly colored at one end to permit the passage of substantially all the light and having uniformly increasing density toward the other end through which only a small portion of the light is transmitted. This increase in density may be produced either by having uniformly colored glass of increasing thickness, i. e., a true wedge shape, or it may equally well be produced by increasingly heavy coloration with the plate having a uniform thickness throughout its length. Adjacent the clear portion of plate 11 is a distance scale 14, calibrated in any suitable units; in the instance shown the unit is miles.

The results of the measurements for yellow-green light are given in the curve of Fig. 4. The ordinates are the ratio of the brightness of the sea at the horizon to the brightness of the sky at the horizon (as measured by yellow-green light), and the abscissas are the miles of visibility. For example, it is seen from the curve 15 that when the visiblity is ten miles, the sea is 0.20 as bright as the sky, when the visibility is two miles the sea is 0.50 as bright as the sky, etc. This curve gives at once the data for the calibration of the wedge 11. This is done by measuring the light transmissions of the wedge at a number of points. Where the transmission is 0.40 we mark 4 miles, where it is 0.30 we mark 6.5 miles, and so on along the wedge. The percentage of light transmitted by the yellow-green wedge is shown in Fig. 3 wherein the ordinates are the percentage of light transmitted and the abscissas are the wave lengths of light. This curve shows that of light having a wave length of 550 milimicrons the transmission at the point measured was about 55 per cent.

When using the instrument, the line between the clear portion 12 and the colored portion 13 is laid on the horizon, the sea being visible through the clear portion and the sky through the shaded portion. The wedge 11 is then slid in the tube until the portion of the light from the sky transmitted through the shaded portion is of the same brightness as the light from the sea through the unshaded part of the wedge and the visibility distance is then read from scale 14.

It will be understood that the above description comprehends only the general and preferred embodiment of our invention and that various changes therein may be made within the scope of the appended claims without sacrificing any of the advantages of this invention.

We claim:

1. In a device of the class described, a telescopic sighting tube, a yellow-green light filter therein and a member slidable through said tube having a yellow-green colored portion of uniformly increasing color density from one end to the other through which the sky at the horizon may be observed, a clear portion through which the sea at the horizon may be viewed to compare its brightness with that of the sky and a scale of distances calibrated proportionately to the relative brightness of the sea and of the sky as determined by the proportion of light from the sky cut off to make the brightness of the sea and the brightness of the sky appear the same, the point on said scale corresponding to the point on said colored portion at which the light from the sky as seen through the colored portion is equalized with the light from the sea as seen through said clear portion indicating the distance of visibility.

2. In a device of the class described, a sighting tube, a light filter therein, and a member slidable transversely through said tube having a portion of the same color as said filter and of uniformly increasing color density from one end to the other through which the sky at the horizon may be observed, a clear portion through which the sea at the horizon may be viewed to compare its brightness with that of the sky and a scale of distances calibrated proportionately to the relative brightness of the sea and of the sky as determined by the proportion of light transmitted through said wedge when the brightness of the sea and of the sky appear the same, the point on said scale corresponding to the point on said colored portion at which the light from the sky as seen through the colored portion is equalized with the light from the sea as seen through said clear portion indicating the distance of visibility.

3. In a device of the class described, a sighting tube, and a member slidable transversely through said tube having a colored portion of uniformly increasing color density from one end to the other through which the sky at the horizon may be observed, a clear portion through which the sea at the horizon may be viewed to compare its brightness with that of the sky and a scale of distances calibrated proportionately to the light transmitting properties of said colored portion, the point on said scale corresponding to the point on said colored portion at which the light from the sky as seen through the colored portion is equalized with the light from the sea as seen through said clear portion indicating the distance of visibility.

4. A device of the class described, a sighting tube, and a member slidable transversely through said tube having uniformly decreasing light transmitting properties through which the sky at the horizon may be observed, a clear portion through which the sea at the horizon may be viewed to compare its brightness with that of the sky and a scale of distance calibrated proportionately to the light transmitting properties of said first mentioned portion, the point on the scale corresponding to the point at which the light from the sky is equalized with the light from the sea indicating the distance of visibility.

5. A device of the class described, comprising a sighting tube and means carried thereby for comparing the brightness of the sea and of the sky at the horizon and a scale of distances associated therewith calibrated proportionately to the relative brightness of the sea and of the sky as determined by such comparison, the point on the scale corresponding to the point at which the light from the sky is equalized with the light from the sea indicating the distance of visibility.

6. A device of the class described, comprising a sighting tube, and a member movable transversely therethrough having a clear portion and a portion of uniformly decreasing light transmitting properties and a distance scale calibrated proportionately to such light transmitting properties at different points in the length of said member, the point on the scale corresponding to the point at which the light from the sky is equalized with the light from the sea indicating the distance of visibility.

7. A method of measuring visibility at sea, comprising the steps of observing the sea at the horizon, simultaneously observing the sky at the horizon through a member having uniformly decreasing light transmitting properties, moving said member to equalize the transmitted light from the sky with that from the sea and from the proportion of the light from the sky transmitted determining the distance of visibility.

8. A method of measuring visibility at sea, comprising the steps of observing the sea at the horizon through a light filter, simultaneously observing the sky at the horizon through said filter and through a member of the same color as said filter having decreasing light transmitting properties from one end to the other, moving said member to equalize the transmitted light from the sky with that from the sea and from the proportion of light from the sky transmitted determining the distance of visibility.

EDWARD O. HULBURT.
CHARLES BITTINGER.